Sept. 25, 1934.　　　G. S. ISKYAN　　　1,974,815
WIND DEFLECTOR
Filed Aug. 11, 1933

George S. Iskyan INVENTOR
BY Wm S Pritchard
ATTORNEY

Patented Sept. 25, 1934

1,974,815

UNITED STATES PATENT OFFICE 1,974,815

WIND DEFLECTOR

George S. Iskyan, Jackson Heights, N. Y., assignor to G. M. Co. Mfg. Company, Inc., Long Island City, N. Y., a corporation of New York Application August 11, 1933, Serial No. 684,608

10 Claims. (Cl. 296—84)

This invention relates to wind-deflectors for vehicles and more particularly to wind-shields for deflecting the side winds of an automobile.

One of the objects of the instant invention is to provide side wind-shields or wind-deflectors which may be easily and quickly applied to the doors and window frames of vehicles with a minimum amount of effort and which may be readily shifted to any desired angular position for deflecting side winds or for directing draft to the interior compartment of the vehicle.

Other objects of the invention will become apparent from the following description, appended claims and accompanying drawing forming a part of this specification, and in which:

Figure 1:
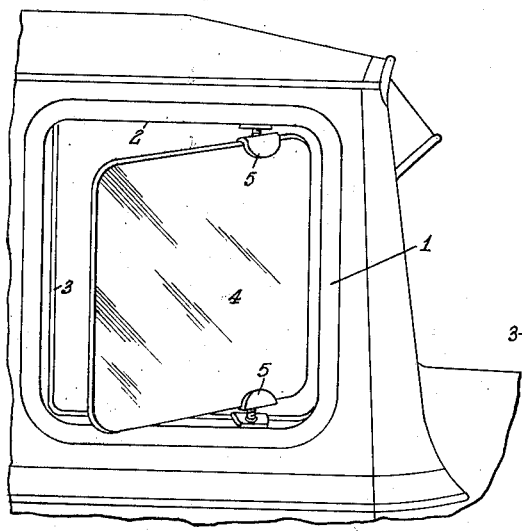
Figure 1 illustrates, in perspective, a portion of a window of a vehicle showing the mounting of the deflector in accordance with this invention.
Figure 2:
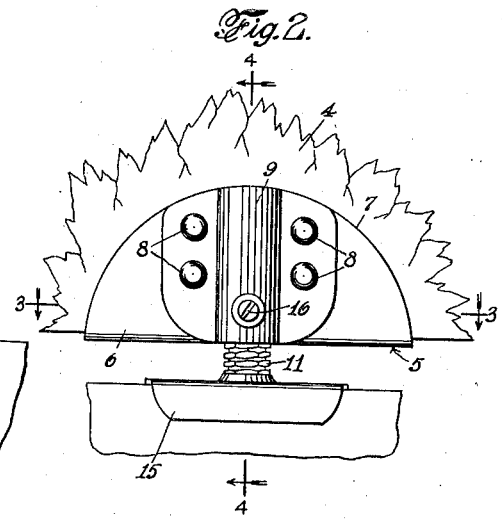
Figure 2 is a rear elevation of the support for mounting the wind-shield in position.
Figure 3:
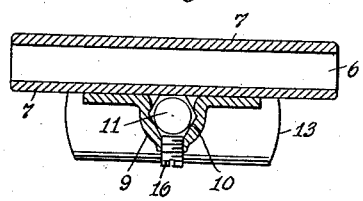
Figure 3 is a section on line 3, 3 of Figure 2.
Figure 4:
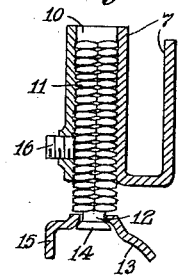
Figure 4 is a section on line 4, 4 of Figure 2.
Figure 5:
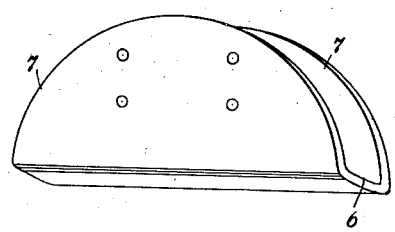
Figures 5, 6, 7 and 8 illustrate details of the elements constituting the support.
Figures 6, 7:
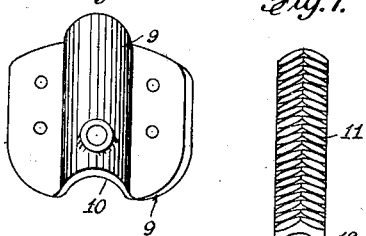
Figure 8:
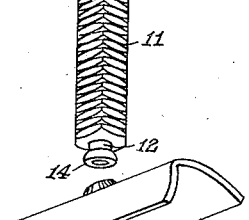

According to the instant invention, there is provided a side wind-shield or wind-deflector, which is adapted to be used in combination with a vehicle window. The means for supporting the wind-deflector in position, are so designed that the wind-deflector may be positioned at various angles relative to the window, whereby side winds may be deflected or a draft may be caused to pass to the interior compartment of the vehicle. The supporting means are also so designed and constructed that they can be associated with any window and shield irrespective of the size thereof.

Referring now to the drawing wherein like reference numerals designate like parts, the reference numeral 1 designates a frame bounding the opening 2, constituting a window of a door of an automobile. The frame 1 is provided with felt-lined channels 3, wherein a plane of plate glass (not shown), constituting a closure for the window, is adapted to slide.

The wind-deflector 4, is adapted to be mounted on the frame 1 adjacent the window in the manner hereafter more fully explained.

As is apparent from the drawing, the shield 4, is frictionally carried by two supports 5, one disposed adjacent the top and one disposed adjacent the bottom. In view of the fact that the two supports 5 are identical in structure, only one will be described in detail The support 5 comprises a channel member 6 substantially U-shaped in section and is adapted to receive the shield 4 in the channel thereof. If desired, pads of any suitable material such as felt, rubber, etc., may be positioned intermediate the walls and shield. In any case, the shield 4 is tightly and frictionally held by the channel member 6. The side walls 7 of the channel member 6, may be made of any suitable shape though in the drawing the walls 7 are shown as being semi-circular.

On one of the walls 7 there is secured in any suitable manner, such as by means of rivets 8, a yoke 9 having an outwardly curved portion, cooperating with the wall opposite thereto to provide a bore 10, which bore 10 is tapped.

It is to be noted that the threads of the bore extend both on the interior of the curved portion of the yoke and on the side wall 7, complemental therewith.

A threaded shank 11, preferably polygonal in shape, is rotatably and adjustably disposed in the opening 10. On one end the shank 11 is provided with an extension or reduced portion 12, on which a pad 13 is freely mounted and held in position by upsetting the end 12 as shown by the reference numeral 14. The pad 13 is provided on one of its longitudinal edges with a depending flange 15, which is adapted to extend in the channel 3 when the device is positioned in place on the frame 1. By suitable rotation of the shank 11, either manually or with the aid of a tool, the pad 13 may be made to firmly grip the frame.

In order to lock the shank 11 against movement in any direction after adjustment in position, there is provided a set screw 16. It is to be noted that the set screw cooperates with one of the flat surfaces of the polygonal shank, thereby serving to provide a more positive lock against any movement of the shank.

As previously stated, the cross-section of the shank 11, is polygonal. In the preferred form illustrated, the shank is hexagonal in the cross-section, though it is obvious that its cross-section may be square, octagonal, etc.

The yoke 9 is preferably made of such dimensions that it is of sufficient size to prevent the free end of the shank 11 from projecting from the top thereof. In other words, the yoke 9 conceals the free end of the shank 11. Because of the size, the yoke in cooperation with the side wall 7 forms a more rugged bearing for the shank 11. It is of course obvious, that insofar as the principles of this invention are concerned, the yoke may be made of such a size that the top of the shank 11 may project therefrom. When this modification is employed, it may be advisable to provide some means to cooperate with said top in order to more securely lock it in position.

The device may be made of any suitable material. In view of the fact that automobile accessories are now made of chromium plated materials, I prefer to also make this device of chromium plated material.

The device is very easy to manufacture. A piece of material is stamped to provide a circular disk, which is then processed to form the channel member 6. These operations may be performed in one or two steps. The rivet holes are drilled in the original material, disc or channel member as desired. The yoke 9 preferably also made by stamping, is then secured in place on the wall 7 by means of rivets 8. The bore 10 constituted by the cylindrical portion of the yoke and the portion of the wall 7, opposite thereto, is then tapped. The pad 13 is positioned on the reduced terminus 12 of the shank 11, after which the reduced portion 12 is upset in order to freely mount the pad 13 of the said shank. The shank together with the pad is then screwed into the threaded bore.

To mount the wind-shield in place, one of the devices previously described is disposed at the top and another disposed at the bottom of the shield. The assembly is then placed in position with the pad 13 disposed on the frame of the window, the horizontal portion of the pad extending across the frame and the flange 15 extending into the channel 3. The shanks 11 of both the supports are then rotated in the desired direction, until the pads 13 tightly and frictionally grip the frame. The set screw 16 is then screwed home and the shank locked in position.

Due to the fact that the pad is mounted on the shank 11 in a freely rotatable position and secured in place on the frame by friction, the shield may be positioned at any desired angle upon mere rotary movement thereof about its vertical axis.

It is to be noted that due to the design and construction of the device, the shield is positioned in very close proximity to the channel 3. Moreover, due to the manner in which the bore is provided, the supports are rugged and strong. No extension for carrying the threaded shank is necessary.

Since it is obvious that various changes and modifications may be made in the above description, without departing from the nature or spirit thereof, this invention is not restricted thereto, except as set forth in the appended claims.

I claim:

1. The combination with a vehicle window opening bounded by a frame having a channel therein and a wind deflecting shield associated therewith, of a plurality of adjustable supports cooperating with the top and bottom edges of said shield to rotatably support the same on said frame, whereby the deflecting shield may be disposed at the desired angle relative to said frame, each of said supports comprising a channeled member in which the shield is positioned, a yoke having an outwardly curved portion intermediate its ends and secured to one side of the channeled member whereby the curved portion and the portion of said side walls opposite thereto constitute a bearing, a polygonally shaped threaded element adjustably disposed in the bearing, and a freely movable pad on one end of said element to frictionally engage the frame.

2. The combination with a vehicle window opening bounded by a frame having a channel therein and a wind deflecting shield associated therewith, of a plurality of adjustable supports cooperating with the top and bottom edges of said shield to rotatably support the same on said frame, whereby the deflecting shield may be disposed at the desired angle relative to said frame, each of said supports comprising a channeled member in which the shield is positioned, a yoke having an outwardly curved portion intermediate its ends and secured to one side of the channeled member whereby the curved portion and the portion of said side walls opposite thereto constitute a bearing, a polygonally shaped threaded element adjustably disposed in the bearing, a freely movable pad on one end of said element to frictionally engage the frame, and means to lock said element against rotation.

3. The combination with a vehicle window opening bounded by a frame having a channel therein and a wind-deflecting shield associated therewith, of a plurality of adjustable supports cooperating with the top and bottom edges of said shield to rotatably support the same on said frame, whereby the deflecting shield may be disposed at the desired angle relative to said frame, each of said supports comprising a channeled member in which the shield is positioned, a yoke having an outwardly curved portion intermediate its ends and secured to one side of the channeled member whereby the curved portion and the portion of said side walls opposite thereto constitute a bearing, a polygonally shaped threaded element adjustably disposed in the bearing, a freely movable pad on one end of said element to frictionally engage the frame, and a set screw cooperating with one of the flat surfaces of said polygonal element to lock it against rotation.

4. The combination with a vehicle window opening bounded by a frame having a channel therein and a wind deflecting shield associated therewith, of a plurality of adjustable supports cooperating with the top and bottom edges of said shield to rotatably support the same on said frame, whereby the deflecting shield may be disposed at the desired angle relative to said frame, each of said supports comprising a channeled member in which the shield is positioned, a yoke having an outwardly curved portion intermediate its ends and secured to one side of the channeled member whereby the curved portion and the portion of said side walls opposite thereto constitute a bearing, a threaded element adjustably disposed in the bearing, and a freely movable pad on one end of said element to frictionally engage the frame.

5. The combination with a vehicle window opening bounded by a frame having a channel therein and a wind deflecting shield associated therewith, of a plurality of adjustable supports cooperating with the top and bottom edges of said shield to rotatably support the same on said frame, whereby the deflecting shield may be disposed at the desired angle relative to said frame, each of said supports comprising a channeled member in which the shield is positioned, a yoke having an outwardly curved portion intermediate its ends and secured to one side of the channeled member whereby the curved portion and the portion of said side walls opposite thereto constitute a bearing, a threaded element adjustably disposed in the bearing, a freely movable pad on one end of said element to frictionally engage the frame, and means to lock said element against rotation.

6. A support comprising a channeled member in which a shield is frictionally held, a yoke having an outwardly curved portion intermediate its ends and secured to one side of the channeled member whereby the curved portion and the portion of said side walls opposite thereto constitute a bearing, a threaded element adjustably disposed in the bearing and a freely movable pad on one end of said element to frictionally engage the frame bounding a window opening.

7. A support comprising a channeled member in which a shield is positioned, a yoke having an outwardly curved portion intermediate its ends and secured to one side of the channeled member whereby the curved portion and the portion of said side walls opposite thereto constitute a bearing, a threaded element adjustably disposed in the bearing, a freely movable pad on one end of said element to frictionally engage the frame bounding a window opening, and mean means to lock said element against rotation.

8. A support comprising a channeled member in which a shield is frictionally held, a yoke having an outwardly curved portion intermediate its ends and secured to one side of the channeled member whereby the curved portion and the portion of said side walls opposite thereto constitute a bearing, a polygonally shaped threaded element adjustably disposed in the bearing and a freely movable pad on one end of said element to frictionally engage the frame bounding a window opening.

9. A support comprising a channeled member in which a shield is positioned, a yoke having an outwardly curved portion intermediate its ends and secured to one side of the channeled member whereby the curved portion and the portion of said side walls opposite thereto constitute a bearing, a polygonally shaped threaded element adjustably disposed in the bearing, a freely movable pad on one end of said element to frictionally engage the frame bounding a window opening, and means to lock said element against rotation.

10. A support comprising a channeled member in which a shield is positioned, a yoke having an outwardly curved portion intermediate its ends and secured to one side of the channeled member whereby the curved portion and the portion of said side walls opposite thereto constitute a bearing, a polygonally shaped threaded element adjustably disposed in the bearing, a freely movable pad on one end of said element to frictionally engage the frame bounding a window opening and a set screw cooperating with one of the flat surfaces of said polygonally shaped element to lock it against rotation.

GEORGE S. ISKYAN.